Figure 1:
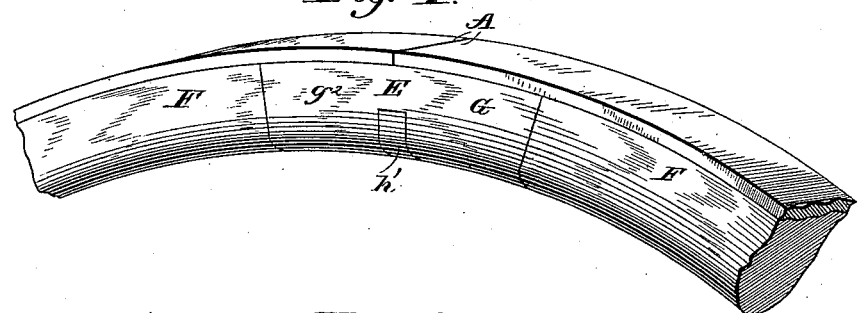

(No Model.)

A. H. PERRY.
TIRE TIGHTENER.

No. 340,352. Patented Apr. 20, 1886.

Old form.

Witnesses
Percy C. Bowen.

Inventor,
Alonzo H. Perry:
By his Attorneys

UNITED STATES PATENT OFFICE.

ALONZO HIRAM PERRY, OF LOUISVILLE, KENTUCKY, ASSIGNOR OF ONE-FOURTH TO R. T. COLSTON, OF SAME PLACE.

TIRE-TIGHTENER.

SPECIFICATION forming part of Letters Patent No. 340,352, dated April 20, 1886.

Application filed January 23, 1886. Serial No. 189,507. (No model.)

*To all whom it may concern:*

Be it known that I, ALONZO HIRAM PERRY, a citizen of the United States, residing at Louisville, in the county of Jefferson and State of Kentucky, have invented a new and useful Improvement in Tire-Tighteners, of which the following is a specification, reference being had to the accompanying drawings.

My invention relates to improvements in tire-tighteners; and it consists of the peculiar and novel construction and combination of parts, substantially as hereinafter fully set forth, and specifically pointed out in the claims.

The invention is an improvement in that class of tire-tighteners which employs a right- and-left-hand threaded bolt that works in threaded sockets of depending lugs that are formed integral with the tire at the ends thereof.

I have found by practical experience in this class of devices that the threaded adjusting-bolts have caused their supporting-lugs to bend or be curved inwardly toward each other and out of their proper vertical position, so that instead of the threaded openings in said lugs being in alignment with each other they are arranged and disposed out of a right line and at an angle to each other. When the threaded openings of the lugs are out of a right line and at an angle to each other, they bend or curve the ends of the bolt, so that it is impossible to rotate it, and thus renders the device inoperative for the purpose of bringing or adjusting the ends of the tire together, and when the lugs bend so as to throw their openings out of alignment the ends of the tire itself immediately in rear of the lugs are bent so that should the tire-ends be drawn together by other means than the adjusting-bolt of the tightener the tire-ends will not register or coincide. This bending of the lugs and the tire has been caused by insufficiently strengthening or bracing the rear ends of the lugs, which have commonly been provided with straight vertical faces, and by applying the power of the adjusting-bolt below the line of motion of the lugs. I propose to overcome the above-named objections by strengthening and bracing the lugs by providing an enlargement that extends rearwardly of the lug in the direction of the curved tire and gradually diminishes in thickness as it approaches the tire until it merges into the latter, the lug, its enlargement, and the tire being formed in one piece for great strength and durability. I also propose to provide a locking device that shall prevent the adjusting-bolt from turning after it has been rotated to bring the ends of the tire together, and to provide an inclosing casing that corresponds to and resembles the fellies, and which shall conceal and protect the lugs and adjusting-bolt from dirt, rust, &c., and to provide a device that is very simple, strong, and durable in construction, thoroughly effective for the purposes designed, and cheap and inexpensive of manufacture.

Figure 2:
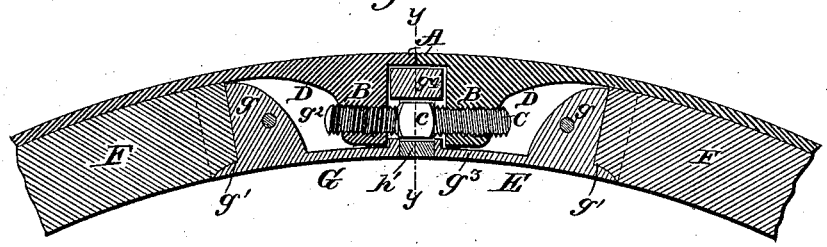
Figure 3:
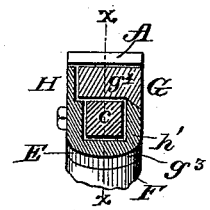
Figure 5:
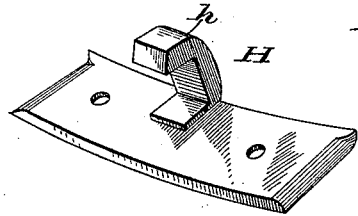
Figure 4:
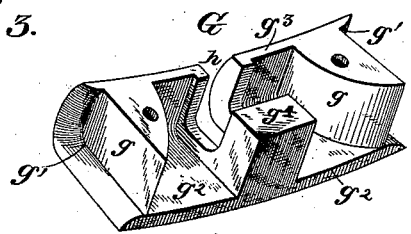
Figure 6:
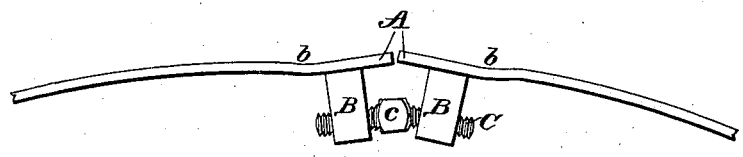

In the accompanying drawings, Figure 1 is a perspective view of a tire-tightener constructed in accordance with my invention. Fig. 2 is a longitudinal vertical sectional view on the line $x\ x$ of Fig. 3. Fig. 3 is a vertical transverse sectional view on the line $y\ y$ of Fig. 2. Figs. 4 and 5 are detail perspective views of the sections of the locking or inclosing casing. Fig. 6 is a diagram showing the manner in which the old form of the parts of a tire-tightener bend when they have been used for some time.

Like letters of reference denote corresponding parts in all the figures of the drawings.

In the diagram shown in Fig. 6 of the drawings, A designates the ends of a tire; B, the depending lugs thereof, which are located at or near the ends of the tire-sections, and C the adjusting-bolt, that works in the threaded openings of the depending lugs. When a device of this character, as ordinarily constructed with straight vertical faces, has been used for some time, the lugs are bent or drawn inwardly toward each other, as clearly shown, so that the openings therein are thrown out of a right line and the bolt C is bent or curved, as shown, the tire being also bent or curved, as at $b$, so that the ends are thrown out of alignment.

In my improved tire-tightener I overcome the above-named objections by strengthening or bracing the lugs by an enlargement, D, that extends rearwardly from the lug toward the tire, and said enlargement gradually diminishes in thickness from the lug as it approaches the tire until it merges into the latter. The lower edge of the enlargement begins at a point on the rear face of the lug, which it strengthens on the plane of the opening in said lug or a little above the same, so that the lug is braced at the point where the greatest strain or power from the adjusting-bolt is brought upon the lugs, and the said lug, its strengthening enlargement, and the tire are all formed in one piece for great strength and durability. Each of the lugs B is provided with a transverse opening, and the threads of these openings are disposed in reverse order. The adjusting screw or bolt C has an enlarged squared portion, c, between its threaded ends for the reception of a wrench or other suitable implement, so that the bolt can be easily rotated, and the ends of said bolt are provided with right and left hand threads that work in the threaded openings of the lugs B, for the purpose of simultaneously closing or dilating the ends of the tire.

E designates an inclosing-casing for the adjusting-bolt, to exclude dirt, &c., therefrom, and this case is of a size and shape corresponding to that of the felly F, to which it bears a very close resemblance when properly secured on the wheel. This bolt-inclosing casing is made in two longitudinal sections, G H, and it is rigidly and detachably connected to the bolt and to each other, for the purpose of obtaining ready and easy access to the bolt to adjust the same and the ends of the tire. Each section of the case is curved longitudinally to correspond to the curvature of the tire and fellies, and the end walls, $g$, of the section G of said casing are provided with countersunk portions $g'$, in which are fitted projecting portions of the fellies; or the ends of the fellies may be recessed or countersunk to receive projecting portions of the casing, as will be very readily understood.

The section G of the inclosing-casing comprises a side wall, $g^2$, a top wall, $g^3$, and the end walls, $g$, and the locking arm or shoulder $g^4$, that fits between the lugs B and beneath the squared portion of the adjusting-bolt, to prevent the casing from movement on the tire and the bolt from rotating after it has been adjusted to the required extent. The upper wall of the casing-section $g^3$ is slotted, as at $h$, and in this slotted portion fits a curved projecting arm, $h'$, of the section H of the casing, said arm fitting snugly in the slot and flush with the upper edges of the walls of said slot, and the lower end of said curved arm bears against the squared portion of the adjusting-bolt. The section H is secured to the section G of the case by screws or bolts, that pass into threaded openings of the end walls of said section G, or by any other suitable means.

My improved casing serves the double purpose of excluding dirt, &c., from its chamber and the adjusting-bolt, and as a lock to prevent the rotation of the bolt after it has been adjusted to the required extent.

The case can be quickly and readily detached or removed from the bolt and lugs to permit the former to be turned by a wrench or other suitable device, and it can be easily and quickly adjusted and secured in position.

The improvements are very simple, strong, and durable in construction, thoroughly effective for the purposes designed, easily and readily operated and adjusted, and cheap and inexpensive of manufacture.

Various changes in the form and proportion of parts can be made without departing from the principle of my invention.

Having thus fully described my invention, what I claim as new, and desire to secure by Letters Patent, is—

1. The combination of a tire, the lugs, an adjustable bolt, a casing which comprises two detachably-connected sections, one of which has a retaining or locking arm that fits beneath the bolt, and the other section having an extended arm that fits in an opening of the felly-section, substantially as described.

2. The combination, with a tire having the lugs and an adjusting bolt, of a sectional casing inclosing the bolt and lugs, one section having an opening, $h$, therein, and the other section an arm, $h'$, fitting in the opening and lying flush with the other section, substantially as described.

In testimony that I claim the foregoing as my own I have hereto affixed my signature in presence of two witnesses.

ALONZO HIRAM PERRY.

Witnesses:
RUDOLF MILLER,
R. T. COLSTON.